US009913464B1

(12) United States Patent
Stokes

(10) Patent No.: US 9,913,464 B1
(45) Date of Patent: Mar. 13, 2018

(54) COOLER ACCESSORY BRACKET AND METHODS OF USE

(71) Applicant: Christopher Michael Stokes, Columbia, SC (US)

(72) Inventor: Christopher Michael Stokes, Columbia, SC (US)

( * ) Notice: Subject to any disclaimer, the term of this patent is extended or adjusted under 35 U.S.C. 154(b) by 0 days.

(21) Appl. No.: 14/490,914

(22) Filed: Sep. 19, 2014

Related U.S. Application Data

(60) Provisional application No. 61/879,724, filed on Sep. 19, 2013.

(51) Int. Cl.
*A01K 97/06* (2006.01)
*A01K 97/10* (2006.01)
*F16M 13/02* (2006.01)

(52) U.S. Cl.
CPC .............. *A01K 97/10* (2013.01); *A01K 97/06* (2013.01); *F16M 13/02* (2013.01)

(58) Field of Classification Search
CPC .... A01K 97/06; A01K 97/10; A47G 25/0607; A47G 25/0614; A47G 25/0621; A47G 25/0628; A47G 29/083; A47G 29/087; A47F 7/0021; A47F 7/0028; A47F 5/08
USPC .......... 43/21.2, 54.1; 211/119.004, 119.005, 211/119.006, 119.007, 119.009, 70.2, 211/70.8; D6/552; D22/147; 248/512, 248/534, 535, 538, 539, 311.2, 314, 248/231.41, 307, 339; 220/735, 915.2, 220/694; 62/457.2, 457.3, 457.4, 457.5, 62/457.7
See application file for complete search history.

(56) References Cited

U.S. PATENT DOCUMENTS

| | | | | |
|---|---|---|---|---|
| 963,000 A | * | 6/1910 | Deihl | F16M 11/24 248/295.11 |
| 2,055,842 A | * | 9/1936 | Haislip | A01K 97/10 224/922 |
| 2,508,527 A | * | 5/1950 | Martin | A47G 25/08 108/152 |
| 3,126,180 A | * | 3/1964 | Mandolare | A01K 97/10 248/229.15 |
| 3,145,848 A | * | 8/1964 | Wood | B60N 3/007 206/563 |

(Continued)

FOREIGN PATENT DOCUMENTS

WO    2006009537    1/2006

OTHER PUBLICATIONS

"Yeti Cooler Casting Platform", http://www.flatoutfishwear.com/yeti-cooler-casting-platform/.

(Continued)

*Primary Examiner* — Stanton L Krycinski
*Assistant Examiner* — Guang H Guan
(74) *Attorney, Agent, or Firm* — Todd A. Serbin; Nexsen Pruet, LLC

(57) ABSTRACT

A removably attachable accessory bracket for a cooler, comprising: an upper portion configured with a low profile to fit wholly within a recess located on an upper rim of the cooler; a pin connected to the upper portion configured as an insertable counterpart to a cooler tie down slot located on the upper rim of the cooler; an offset bracket with a tie down slot connected to the upper portion and configured for passing a tie down strap therethrough; and, at least one accessory connected to the bracket.

12 Claims, 8 Drawing Sheets

(56) References Cited

U.S. PATENT DOCUMENTS

| | | | | |
|---|---|---|---|---|
| 3,291,427 A * | 12/1966 | Hutchings | ............ | A47B 81/005 211/70.8 |
| 3,543,432 A * | 12/1970 | Gates | .................... | A01K 97/10 248/511 |
| 3,989,213 A * | 11/1976 | Allen | ................... | G10K 11/004 248/214 |
| 4,353,182 A | 10/1982 | Junkas | | |
| 4,749,112 A * | 6/1988 | Harper | ............... | A47G 23/0225 224/482 |
| 4,819,843 A * | 4/1989 | Nakayama | ............. | B60N 3/103 108/44 |
| 5,044,109 A * | 9/1991 | Fast | ....................... | A01K 97/10 224/666 |
| 5,106,046 A * | 4/1992 | Rowles | ................. | B60N 3/103 248/214 |
| 5,279,452 A * | 1/1994 | Huynh | ................... | B60N 3/103 108/46 |
| 5,368,267 A * | 11/1994 | Howard | ................. | A47G 7/044 248/208 |
| D370,681 S * | 6/1996 | Diamond | .................... | D14/252 |
| 5,628,485 A * | 5/1997 | Ray | .................... | A47G 23/0225 248/230.5 |
| 5,915,942 A * | 6/1999 | Ratliffe | .................. | A01K 97/10 224/251 |
| 6,185,860 B1 | 2/2001 | Thibodeaux | | |
| 6,435,469 B1 * | 8/2002 | Ratcliff | ..................... | A45F 5/00 248/213.2 |
| 6,467,779 B1 * | 10/2002 | Mills | ....................... | A01K 97/06 224/922 |
| 6,550,791 B2 * | 4/2003 | Ramsey | ................. | A01K 97/22 280/47.19 |
| 6,672,559 B1 * | 1/2004 | Boldia | ................... | A01K 97/10 248/534 |
| 6,742,757 B2 * | 6/2004 | Fox | ......................... | G09F 17/00 248/535 |
| 7,032,753 B2 | 4/2006 | Purvis | | |
| 7,140,507 B2 | 11/2006 | Maldonado et al. | | |
| 7,389,608 B1 * | 6/2008 | MacKay | ................ | A01K 97/05 206/315.11 |
| 7,472,510 B1 * | 1/2009 | Fasola | .................... | A01K 97/08 43/21.2 |
| 7,559,602 B2 | 7/2009 | Ward et al. | | |
| 7,584,847 B2 | 9/2009 | Purvis | | |
| 7,992,833 B1 * | 8/2011 | Goodman | .......... | A47G 25/0614 248/298.1 |
| 8,240,079 B2 * | 8/2012 | Wakefield | .............. | A01K 97/10 43/21.2 |
| 8,375,622 B1 * | 2/2013 | Holzmann, Jr. | ........ | A01K 97/10 43/21.2 |
| 8,393,111 B1 * | 3/2013 | Johnson | ................ | A01K 97/08 211/70.8 |
| 2007/0119093 A1 * | 5/2007 | Jaskulski | ............... | A01K 97/06 43/54.1 |
| 2008/0295383 A1 * | 12/2008 | Wakefield | .............. | A01K 97/10 43/21.2 |
| 2011/0056233 A1 | 3/2011 | Flaker et al. | | |
| 2011/0198469 A1 * | 8/2011 | Chen | .................... | A47G 25/0614 248/304 |
| 2012/0132657 A1 | 5/2014 | Seiders | | |
| 2014/0331543 A1 * | 11/2014 | Hancock | ................ | A01K 97/01 43/17 |
| 2015/0150231 A1 * | 6/2015 | Norman | ................. | A01K 97/08 43/17.5 |

OTHER PUBLICATIONS

Yeti Tie-Down Kit, store.yeticoolers.com/tie-down-kit/.
Yeti Locking Bracket, store.yeticoolers.com/products/locking-bracket/.
Engel Tie Down Strap Kit, http://www.engel-usa.com/products/deepblue-accessories/miscellaneous-accessories-36/engel-tie-down-strap-kit.

\* cited by examiner

COOLER ACCESSORY BRACKET AND METHODS OF USE

RELATED APPLICATIONS

This application claims the benefit of priority under 35 USC § 119(e) of U.S. Provisional Patent Application No. 61/879,724 filed Sep. 19, 2013, the contents of which are incorporated herein by reference in their entirety.

FIELD AND BACKGROUND OF THE INVENTION

The present invention, in some embodiments thereof, relates to coolers and/or ice chests and, more particularly, but not exclusively, to a bracket for use with coolers.

Various attempts have been made to provide brackets and/or interchangeable accessories to coolers.

United States Pat. App. Pub. No. 20120132657 to Seiders, the disclosure of which is incorporated herein by reference, describes a latching mechanism/device is provided, as well as a method of maintaining a closed position between opposing first and second portions of a container. The latching mechanism includes a latch attached to the first portion and a latch keeper integrally molded to the second portion. The latch keeper includes an elongated keeper slot and a recessed pocket formed in the keeper slot, such that when at least a portion of the latch is received within the recessed pocket, the container is closed and/or sealed.

United States Pat. App. Pub. No. 20110056233 to Flaker, et al., the disclosure of which is incorporated herein by reference, describes a recreational cooler with a hollow accessory shaft. The hollow shaft extends completely through the cooler from top to bottom. The hollowed area of the shaft is completely independent from the product receiving area of the cooler allowing for insertion of recreational cooler accessories. Recreational cooler accessories may include: umbrellas, fishing poles, radios, tables, cooking stands, seats, chairs, beverage bottles, cans, cups, basketball standards, and/or racks for drying beach towels. Two coolers may also be used to support each side of a volleyball net, badminton net, or tennis net.

U.S. Pat. No. 7,628,033 to Skeels, et al., the disclosure of which is incorporated herein by reference, describes a portable accessory including a plurality of platforms having substantially planar upper surfaces for supporting the foodstuff thereon. Each platform is provided with baffled slots such that melted ice can drain downwardly therethrough. In an alternate embodiment, a plurality of spaced racks are slidably positionable within a cooler body such that the racks become spaced apart adjacent to opposed ends of a cooler body. Such racks are offset at an oblique angle so that melted ice is directed downwardly and away from the top surfaces of the platforms. In a further embodiment, a specially designed cooler is provided with slots for receiving the racks therein such that the platforms can be simultaneously employed with the racks.

U.S. Pat. No. 7,559,602 to Ward, et al., the disclosure of which is incorporated herein by reference, describes a cooler having an integrated seat assembly, including a cooler body which can have one or more compartments. The cooler body is coupled with a seat assembly bracket by a coupling means, such as a hinge. Seat backs are integrally formed in one sidewall of the cooler body and seat bottoms are formed on the bracket, such that when the bracket is opened, it forms a seat with the seat backs. The bracket can be folded up flat against the cooler in a closed and locked position, for easy storage or transportation.

U.S. Pat. No. 7,584,847 to Purvis, the disclosure of which is incorporated herein by reference, describes interchangeable portions of a cooler or container, having a sports logo thereon, allowing a single cooler body or container body to have a first logo at one particular time, and a second logo at another time, upon replacement of interchangeable the portions. Preferably, the portions comprise a plurality of cooler tops, each having a different sports logo, each mating directly or through interchangeable hinge portions with the same cooler body, or being secured to a planar portion of the cooler or container. Alternatives for securing the attachment to the cooler planar portion are disclosed and include adhesive, VELCRO brand fasteners, guide members, or elastomeric attaching members.

U.S. Pat. No. 7,140,507 to Maldonado, et al., the disclosure of which is incorporated herein by reference, describes an improved insulated cooler having accessory holders detachably secured to its outer wall. An exemplary holder is provided for containerized drinks. The holder is made of a rigid plastic upper ring at the top and may have flexible fabric or mesh lower portion at the bottom such that the holders can be nested into receptacles in the top surface of the lid for convenient storage. This arrangement provides the benefit of permitting the user to access conveniently the contents of the ice chest without having to remove drinks that otherwise would be sitting on the lid of the ice chest. There also may be one or more connections on the ice chest that permit a fishing rod holder, an umbrella holder, or other accessory holder to be affixed to the cooler.

U.S. Pat. No. 7,032,753 to Purvis, the disclosure of which is incorporated herein by reference, describes interchangeable portions of a cooler or container, having a sports logo thereon, allowing a single cooler body or container body to have a first logo at one particular time, and a second logo at another time, upon replacement of interchangeable the portions. Preferably, the portions comprise a plurality of cooler tops, each having a different sports logo, each mating directly or through interchangeable hinge portions with the same cooler body, or being secured to a planar portion of the cooler or container. Alternatives for securing the attachment to the cooler planar portion are disclosed and include adhesive, VELCRO brand fasteners, guide members, or elastomeric attaching members.

U.S. Pat. No. 6,185,860 to Thibodeaux, the disclosure of which is incorporated herein by reference, describes a fisherman's cooler including a box-shaped container having a pivotable lid for covering a substantially open top portion. The lid includes an indented portion on its upper surface having measuring indicia therein for assisting a fisherman in measuring a fish. The top portion of the container includes a plurality of fishing rod holders, the diameter of which may be varied to support varying diameter fishing rods. An accessory shelf is hingedly attached to the front wall of the container for supporting various accessory items thereon. The accessory shelf may be locked in a horizontal position with a locking mechanism.

U.S. Pat. No. 4,353,182 to Junkas, et al., the disclosure of which is incorporated herein by reference, describes a fishing box which incorporates the following built-in features: tackle box, seat, life preserver, fishing rod carrier, cooler, worm and minnow bait compartment, fish compartment, lid-table tray, a flip-out side table, a ruler for measuring the lengths of fish, a fish net holder, towel rack, and an accessory attachment for supporting an accessory such as a portable radio.

PCT Pub. No. WO2006009537 to Schmidt, et al., the disclosure of which is incorporated herein by reference, describes insulated ice chest coolers having accessory holders detachably secured to their outer walls or edges between their outer walls are disclosed. An exemplary holder is provided for containerized drinks. The holder can be made of a rigid plastic upper ring at the top and can have flexible fabric or mesh lower portion at the bottom such that the holders can be nested into receptacles in the top surface of the lid for convenient storage. This arrangement provides the benefit of permitting the user to access conveniently the contents of the ice chest without having to remove drinks that otherwise would be sitting on the lid of the ice chest. There also can be one or more connections on the ice chest that permit a fishing rod holder, an umbrella holder, or other accessory holder to be affixed to the cooler.

The YETI® Cooler Casting Platform article posted on flatoutfishwear.com (http://www.flatoutfishwear.com/yeti-cooler-casting-platform/) describes a YETI® cooler modified to include rod holders mounted to the sides of the cooler using stainless steel screws and adhesive sealant.

The YETI® Tie-Down Kit found for sale on the official YETI® website (store.yeticoolers.com/tie-down-kit/) describes using tie down slots in conjunction with the Tie-Down Kit to secure the cooler to a deck plate.

The YETI® Locking Bracket found for sale on the official YETI® website (store.yeticoolers.com/products/locking-bracket) describes using a locking bracket inserted through an integrated tie-down slot in order to lock the cooler to something, for example using a chain.

The Engel Tie-Down Strap Kit found for sale on the official Engel website (www.engel-usa.com/products/deep-blue-accessories/engel-tie-down-strap-kit) describes using tie down slots in conjunction with the Tie-Down Strap Kit to secure the cooler to a deck plate.

SUMMARY OF THE INVENTION

The present invention, in some embodiments thereof, relates to coolers and/or ice chests and, more particularly, but not exclusively, to a bracket for use with coolers.

There is provided in accordance with an exemplary embodiment of the invention, a removably attachable accessory bracket for a cooler, comprising: an upper portion configured with a low profile to fit wholly within a recess located on an upper rim of the cooler; a pin connected to the upper portion configured as an insertable counterpart to a cooler tie down slot located on the upper rim of the cooler; an offset bracket with a tie down slot connected to the upper portion and configured for passing a tie down strap therethrough; and, at least one accessory connected to the bracket.

In an embodiment of the invention, the at least one accessory is removably connected to the bracket.

In an embodiment of the invention, the accessory is at least one of a rod holder, a cup holders, an ammunition holders, a boga grip holder, a fly rod holder, a camera attachment point, a grab rail, a shelf, a table, a seat, electronics, or a light.

In an embodiment of the invention, the upper portion is configured to rest on a large recess of the upper rim of the cooler.

In an embodiment of the invention, the upper portion is configured to rest on a small recess of the upper rim of the cooler.

In an embodiment of the invention, the pin between ⅛" and 4" wide and ⅛" and 10" long.

In an embodiment of the invention, the space between the pin and a face of the bracket is between ⅛" and 4".

In an embodiment of the invention, the pin is inserted into the cooler tie down slot using at least one of a compression fit, a mechanical fit and gravity.

In an embodiment of the invention, the bracket further comprises a locking mechanism connecting the pin to the offset bracket, enclosing a portion of the upper rim of the cooler therebetween.

In an embodiment of the invention, the low profile is 0.5" or less.

In an embodiment of the invention, the low profile is 0.25" or less.

In an embodiment of the invention, the low profile is 0.125" or less.

In an embodiment of the invention, at least one of the upper portion and offset bracket are curved.

There is further provided in accordance with an exemplary embodiment of the invention, an accessory bracket for a cooler, comprising: a pin insertable into a tie down slot located on the cooler to secure the bracket to the cooler; a supplemental tie down slot configured for passage of a tie down strap therethrough; and, at least one accessory connected to the bracket.

There is further provided in accordance with an exemplary embodiment of the invention, a method for inserting a bracket into a cooler, comprising: opening the cooler lid; lining up a pin of the bracket with a tie down slot of the cooler; and, inserting the pin into the tie down slot of the cooler so that the pin is positioned within the tie down slot and the bracket rests on an upper rim of the cooler such that the lid fully closes.

In an embodiment of the invention, the method further comprises threading a tie down strap through a supplemental tie down slot located on the bracket to secure the cooler in place.

In an embodiment of the invention, the method further comprises attaching an accessory to the bracket.

In an embodiment of the invention, the accessory is removably attached to the bracket.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example, are not necessarily to scale, and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to coolers and/or ice chests and, more particularly, but not exclusively, to a bracket for use with coolers.

Figure 1:
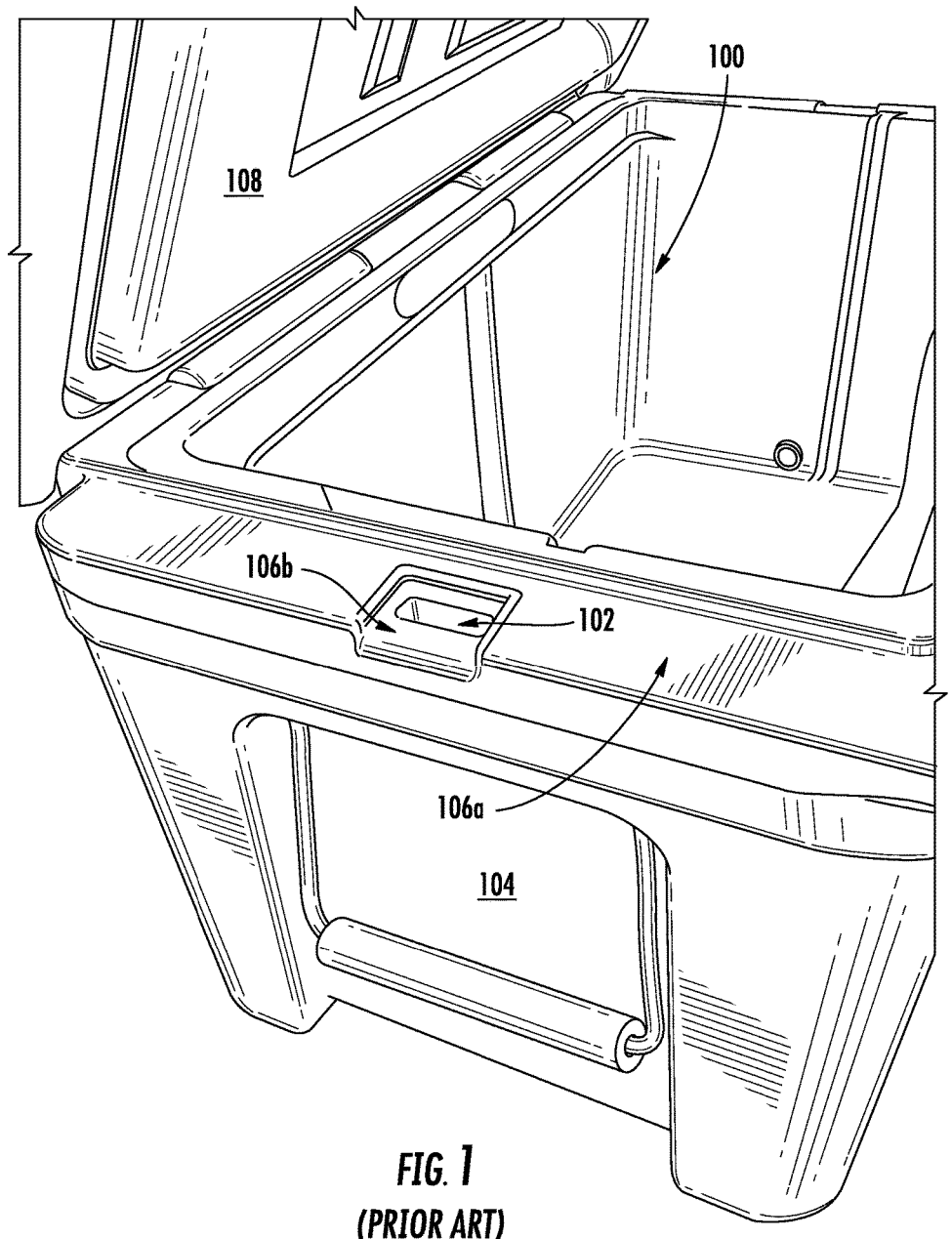
FIG. 1 is a perspective view of an industry standard premium cooler configuration.

For purposes of better understanding some embodiments of the present invention, as illustrated in FIGS. 2-7 of the drawings, reference is first made to the construction and operation of an industry standard premium cooler 100 of a particular configuration, as illustrated in FIG. 1. Exemplary industry standard premium cooler configurations include the YETI® Tundra, K2 Summit and Engel DeepBlue series of coolers, all notably including at least one tie down slot 102. The configuration's tie down slot 102 is conventionally an integrated part of the chest portion 104 of the cooler, although not necessarily so. Another typical feature of this configuration is at least one recess 106a, 106b on the upper cooler rim which allows for the lid 108 of the cooler to close when a tie down strap is used with the tie down slot 102. In an embodiment of the invention, large recess 106a is a slight depression, like a ledge, on the exterior side wall of the cooler which extends the length of the side on many coolers and/or ice chests. When the lid 108 is closed, a slight gap is formed between the closed lid 108 and the chest 104. Additionally or alternatively to the large recess 106a, a small recess 106b is also provided to the cooler, which is adapted for receipt of the tie down strap therein.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 2:
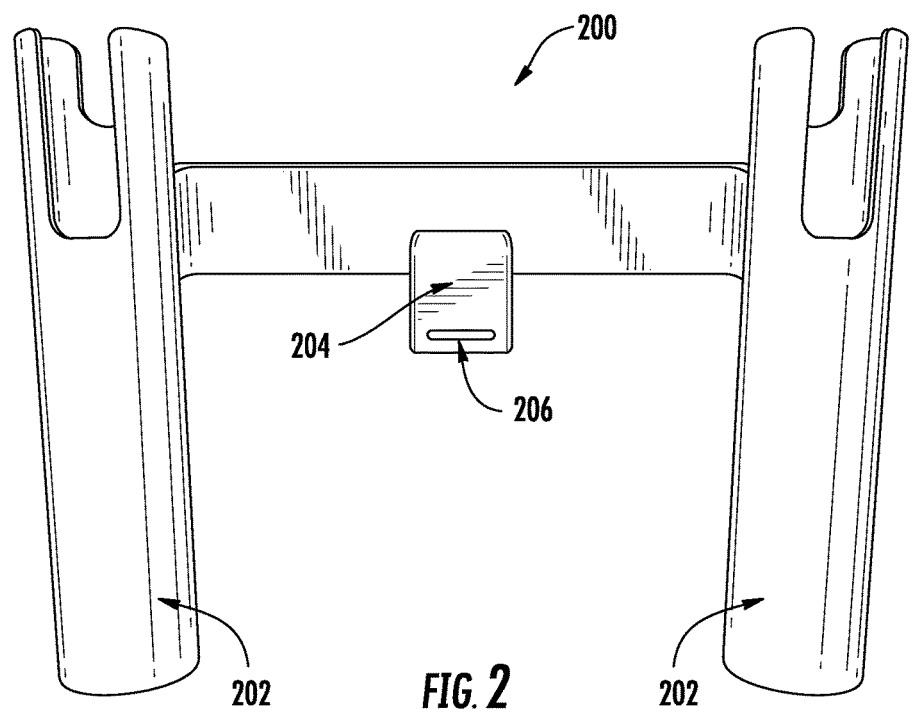
FIG. 2 is a perspective front view of a bracket, in accordance with an exemplary embodiment of the invention.

Referring now to the drawings, FIG. 2 illustrates a perspective view of a bracket 200, in accordance with an exemplary embodiment of the invention. In an embodiment of the invention, at least one accessory 202 is attached to the bracket 200. Optionally, the accessory 202 is permanently attached to the bracket 200, for example by welding, adhesive, screws, pins, or the like. Optionally, the accessory 202 is removably attached, for example using a click in/click out or slide on/slide off kind of interface. Examples of accessories 202 which are attachable to the bracket 200 include rod holders (such as shown), cup holders, shell holders (ammunition), boga grip holders, fly rod holders, camera attachment points, grab rails, shelves or tables, elevated seats, electronics, lights, and the like. It should be understood that the accessories which are usable with the bracket 200 are interchangeable and/or are a part of a system of interchangeable accessory options to be used with the bracket 200, in an embodiment of the invention. In some embodiments of the invention, where the accessory 202 attaches to the bracket 200, an attachment point is optionally variable, for example by providing a rail on which the accessory 202 slides and to which the accessory can be removably attached anywhere along the rail. In some embodiments of the invention, more than one accessory 202 and/or accessory type can be attached to the same side of the bracket 200 depending on the size and/or configuration of particular accessories. Optionally, more than one attachment point is provided to the bracket. Optionally, more than one attachment point is provided to a single side of the bracket 200.

Provided to the bracket 200, in an embodiment of the invention, is an offset bracket 204 on which a supplemental tie down slot 206 is located to enable the use of commercially available tie-down kits to be used with the cooler 100 and bracket 200 combination. Optionally, the supplemental tie down slot 206 is located on the bracket 200 itself.

Figure 3:
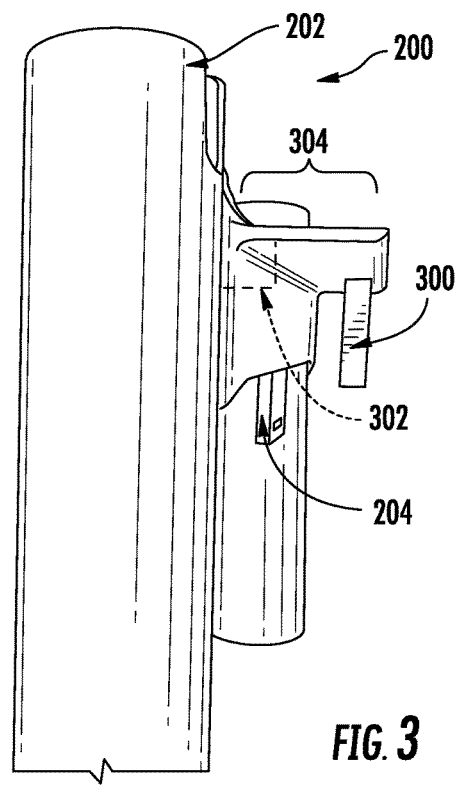
FIG. 3 is a side view of the bracket of FIG. 2, in accordance with an exemplary embodiment of the invention.
Figure 4:
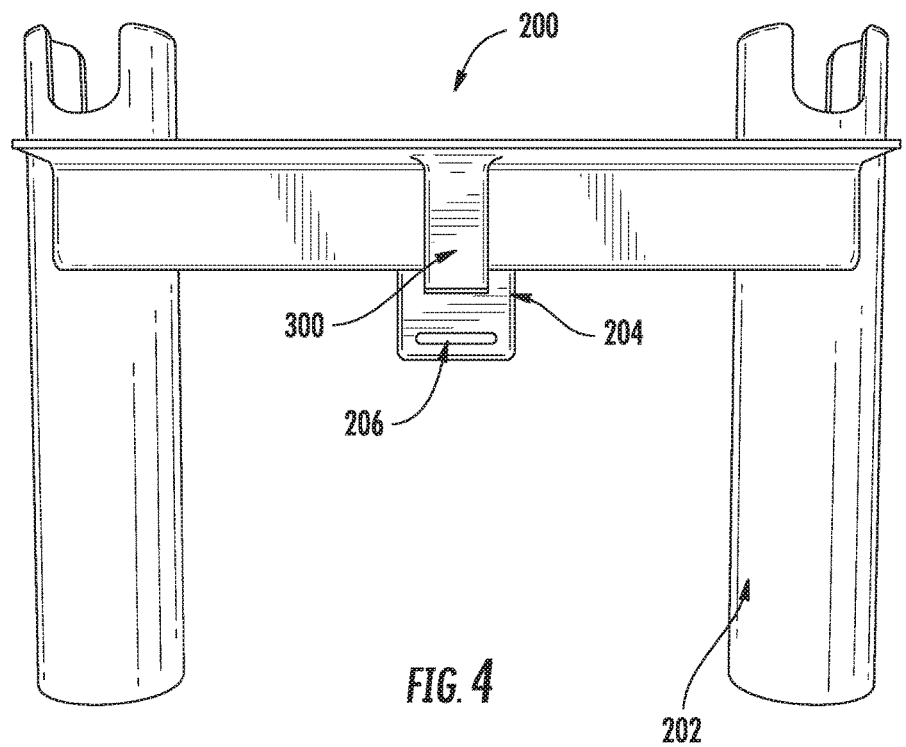
FIG. 4 is a rear view of the bracket of FIG. 2, in accordance with an exemplary embodiment of the invention.

FIG. 3 is a side view of the bracket 200, in accordance with an exemplary embodiment of the invention. In some embodiments of the invention, a pin 300 (also shown in FIG. 4) is provided to the bracket 200 which operates as a counterpart to the tie down slot 102 of the industry standard premium cooler configuration 100, wherein the pin 300 fits within the slot 102, thereby removably attaching the bracket 200 to the cooler. Optionally, pin 300 fits snugly within slot 102. Optionally, pin 300 fits loosely within slot 102. In some embodiments of the invention, pin 300 size and/or location and/or configuration is changed depending on the cooler 100 brand (e.g. Yeti®, K2, Engel) and/or model and/or size of cooler. Optionally, the pin 300 is "one-size-fits-all", perhaps not actually fitting every single size and/or configuration but being functionally usable with a plurality of different coolers 100 without modification so that the bracket 200 does not fall off and/or out of the cooler 100.

In some embodiments of the invention, the bracket 200 and pin 300 are formed from right angles 302 with respect to each other. Alternatively, at least one of the angles 302 is not 90°. In an embodiment of the invention, the space 304 between the bracket 200 and the pin 300 is configured so that the portion of the cooler 100 between the slot 102 and the exterior of the cooler 100 fits snugly between the bracket 200 and the pin 300, when the bracket 200 is installed on the cooler 100 (such as shown and described in more detail with respect to FIG. 7). In an embodiment of the invention, the largely squared corners of this configuration match the largely squared corners of the cooler on which it is placed, for increased strength and stability, particularly when the lid 108 is closed. Optionally, the configuration of the bracket and pin are adapted to match the cooler on which it is intended to be used (e.g. lengthening or shortening and/or making wider or narrower and/or making thinner or thicker and/or curving surfaces to match the cooler contours). In an embodiment of the invention, the bracket 200 is capable of withstanding over 150 lbs of force pulling away from the side face of the cooler 100.

In an embodiment of the invention, an upper portion of the bracket 200 is sized to fit within the recess 106a and/or 106b without interfering with the operation of the lid 108 closing and/or sealing the cooler 100 (i.e. the bracket 200 is "low-profile"). For example, the upper portion of the bracket 200 has a low enough profile (in height as measured from the top of the cooler at the recess 106a or 106b to the bottom of the lid 108 when the lid 108 is closed completely) and/or is narrow enough (in width as measured from the front of the cooler to the back) and/or is short enough (in length as measured from one side of the cooler to the other side of the cooler) so that the lid 108 closes completely onto the chest 104 of the cooler 100. The low-profile nature of the upper portion of the bracket is shown in more detail in FIG. 7. In some embodiments of the invention, low profile means 1" or less. Optionally, low profile means 0.5" or less. Optionally, low profile means 0.25" or less. Optionally, low profile means 0.125" or less.

Figure 5:
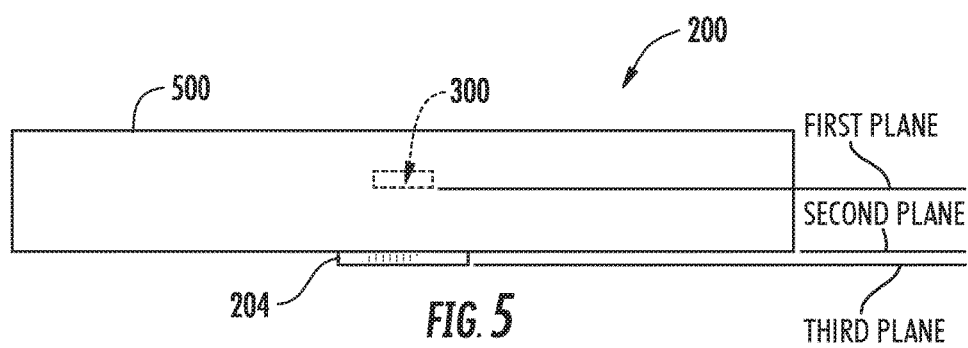
FIG. 5 is a top view of the bracket of FIG. 2, in accordance with an exemplary embodiment of the invention.
Figure 7:
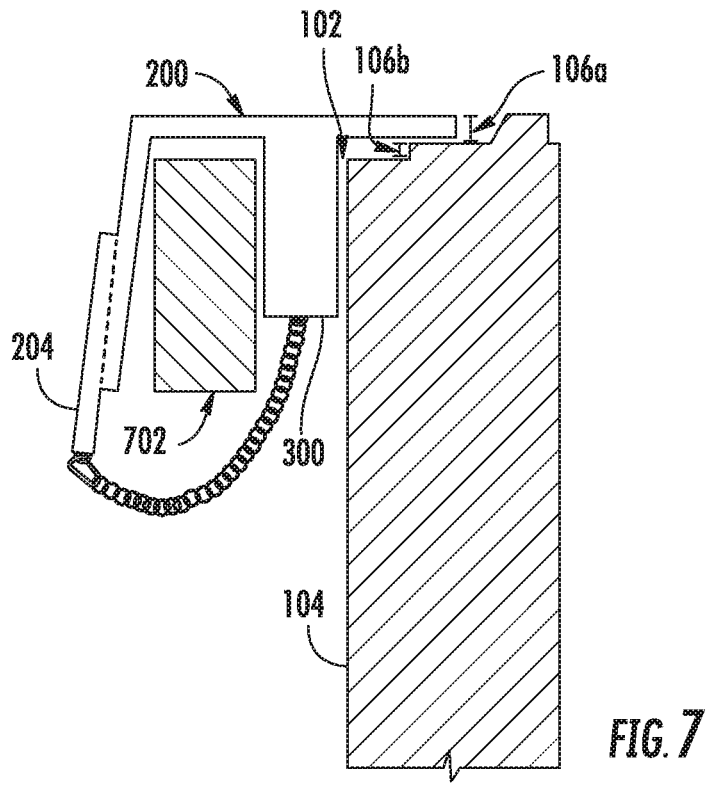
FIG. 7 is a cross-sectional view of the bracket of FIG. 2 inserted into the cooler of FIG. 1 across a tie down slot, in accordance with an exemplary embodiment of the invention.

FIG. 5 is a top view of the bracket 200, in accordance with an exemplary embodiment of the invention. Not shown are any of the accessories which would be attached to the bracket 200. In an embodiment of the invention, offset bracket 204 is located external to and in front of the main body 500 of the bracket 200. Optionally, offset bracket 204 is flush with the main body 500 of the bracket. Optionally, the tie down slot 206 is integrated with the main body 500 of the bracket and not with an offset bracket 204. As also shown in FIGS. 3 and 7, in an embodiment of the invention, the pin 300 is located on the bracket 200 so that the space between the pin 300 and the exterior surface of the bracket 200, which together bookend the wall of the chest 104, providing stability and/or removably securing the bracket 200 to the cooler 100, for example by a compression fit and/or by gravity and/or mechanically.

Figure 6A:
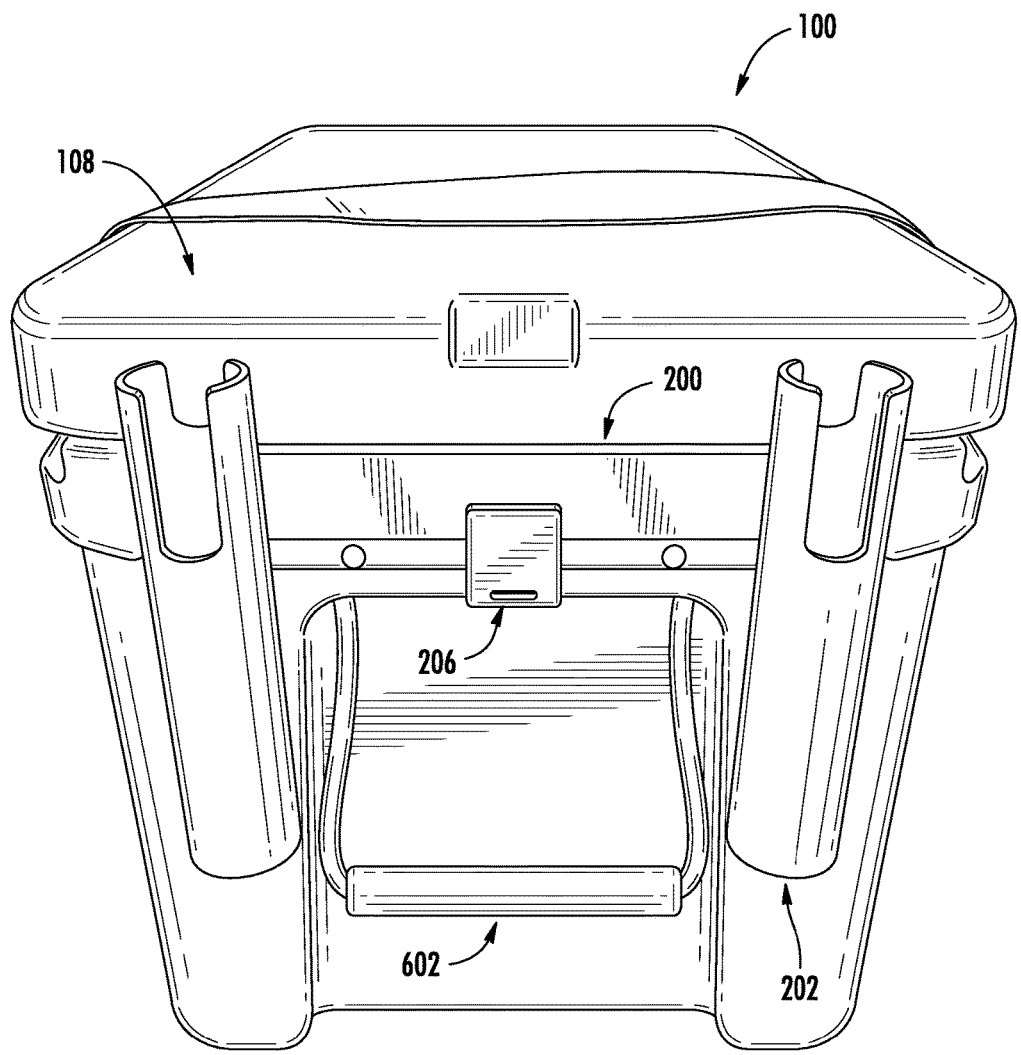
FIG. 6A is a perspective view of the bracket of FIG. 2 inserted into the cooler of FIG. 1 with the lid closed, in accordance with an exemplary embodiment of the invention.

FIG. 6A is a perspective view from the side of the cooler, of the bracket 200 inserted into the cooler 100, in accordance with an exemplary embodiment of the invention. In an embodiment of the invention, the lid 108 closes completely on the chest 104 while the bracket 200 is installed. The supplemental tie down slot 206 is optionally used to tie the cooler down while the bracket 200 is being used, in an embodiment of the invention. Rod holders are shown as the accessories 202 being used with the bracket 200, but any accessory and any combination of accessories could optionally be used. The bracket allows for a high mounting point on the cooler to allow accessories to be mounted flush with the surface of the cooler and/or to allow for easier access and/or to provide additional room underneath the accessories.

It should also be noted that the bracket 200, when installed on the cooler 100, does not interfere with the use of the cooler handles 602 or with the use of a drain plug (not shown).

Figure 6B:
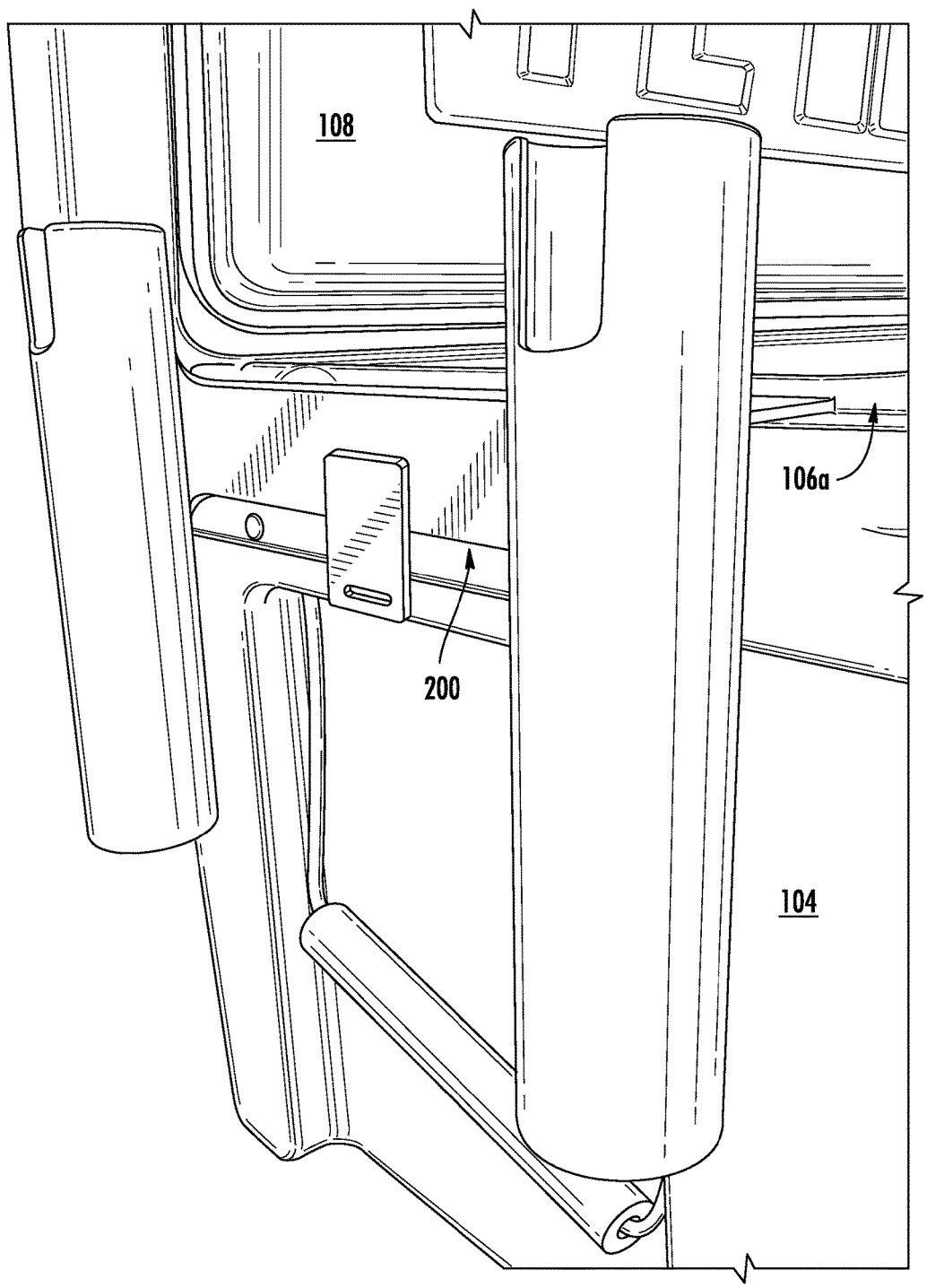
FIG. 6B is a perspective oblique angled view of the bracket of FIG. 2 inserted into the cooler of FIG. 1 with the lid opened, in accordance with an exemplary embodiment of the invention.

FIG. 6B is a perspective view from an oblique angle (between the side and the front of the cooler) which shows the bracket 200 installed with the lid 108 open. It can be seen from this view that, in an embodiment of the invention, the bracket 200 lies in the large recess 106a on the side of the cooler 100. As described elsewhere herein, the bracket 200 could be configured to lie within the small recess 106b, which is nominally reserved for the tie down strap, additionally or alternatively to the large recess 106a.

FIG. 7 is a cross-sectional view of the bracket of FIG. 2 inserted into the cooler 100 of FIG. 1 across where the tie down slot 102 is located, in accordance with an exemplary embodiment of the invention. It can be seen in greater detail that the pin 300 and the portion of the bracket 200 located on the exterior of the cooler 100 bookend the exterior wall 702 of the chest 104, in an embodiment of the invention. It should be understood that these bracket 200 is shown slightly separated from the chest 104 and wall 702 for clarity's sake and that in some embodiments of the invention, the bracket 200 would be resting and/or abutting on the cooler 100. In FIG. 7, the offset tab 204 and the face of the bracket 200 are shown angled at slightly more than a 90° angle, it should be understood that the angle of the offset 204 tab and/or face of the bracket could be at virtually any angle, for example it is shown substantially vertical (angle 302 is at 90°) in FIG. 3.

FIG. 7 also shows the "low-profile" nature of the bracket 200, in that its height (where the bracket 200 lays on the large recess 106a) is equal to or less than the height of large recess 106a, thereby not obstructing the proper operation and/or closing and/or sealing of the lid.

In an embodiment of the invention, a locking mechanism (not shown) connects the pin 300 to the offset bracket 204, around the exterior wall 702. The locking mechanism can be, for example a removably attachable chain or additional bracket piece.

Figure 8:
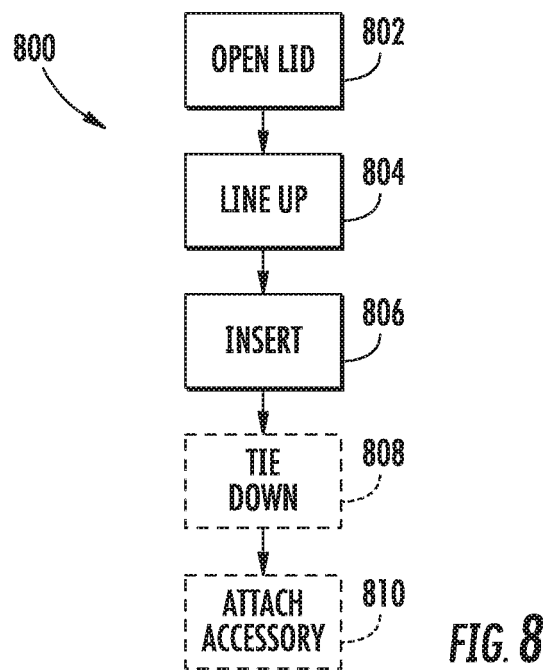
FIG. 8 is a flowchart depicting a method of inserting a bracket into a cooler, in accordance with an exemplary embodiment of the invention; and, FIGS. 9A-9C are front, back and side views, respectively, of an exemplary bracket, in accordance with an exemplary embodiment of the invention.

FIG. 8 is a flowchart 800 depicting a method of inserting a bracket 200 into a cooler 100, in accordance with an exemplary embodiment of the invention. The bracket 200 is installed by first opening (802) the cooler lid 108. The pin 300 of the bracket 200 is lined up (804) with the tie down slot 102 and the pin 300 is inserted (806) into the slot 102 by sliding it down into place while ensuring that the exterior of the bracket 200 fits down on the exterior surface of the cooler. In an embodiment of the invention, removal of the bracket 200 is accomplished by opening the lid 108 and then reversing the other steps described above. Optionally, a tie down strap is threaded (808) through the supplemental tie down slot 206 in order to removably secure the cooler to the floor. Optionally, at least one interchangeable accessory is removably attached or detached (810) from the bracket 200.

In an embodiment of the invention, no tools are needed to install and/or remove the bracket 200 from the cooler.

Figure 9A:
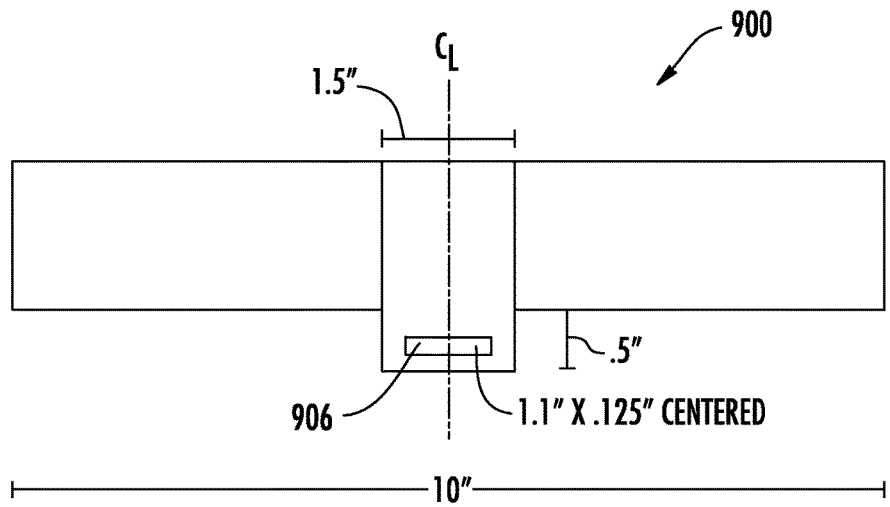
Figure 9B:
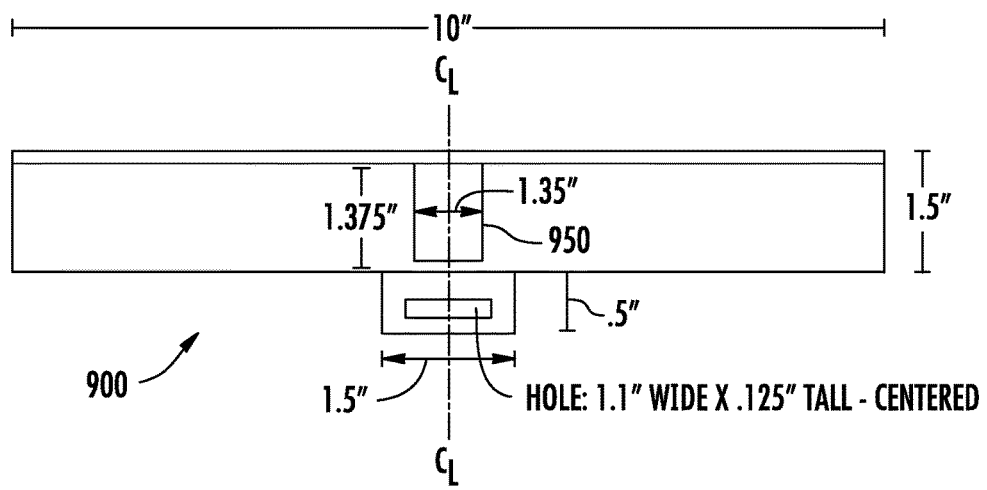
Figure 9C:
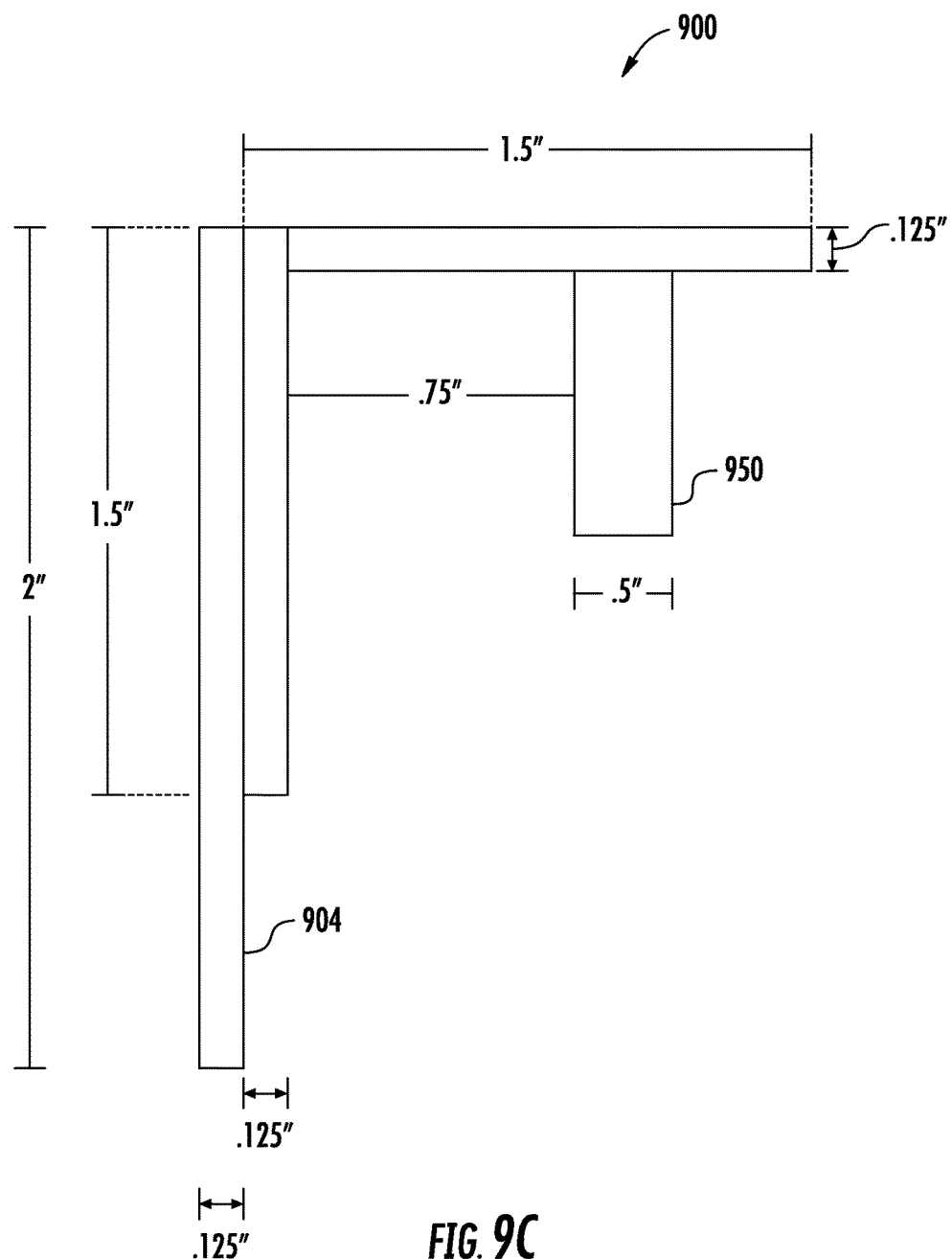

A central portion of an exemplary bracket 900 (i.e. without accessories or accessory attachment points) is shown in FIGS. 9A-9C, with exemplary dimensions. It should be understood that these dimensions are by way of example only, and that it is conceived that they could vary, for example depending on intended accessory use, make, model, cooler and/or tie down slot size. For example, the space 304 between the pin 300 and the face of the bracket 200 is of any size from ⅛" to 3". In some embodiments of the invention, the pin 300 is ⅛" to 4" wide (extending horizontally to the floor) and ⅛" to 10" long (extending vertically to the floor). FIG. 9A shows 25 the front of bracket 900 and the appurtenant supplemental tie down slot 906 located in an offset bracket 904. FIG. 9B shows a rear view of bracket 900, including a pin 950 for insertion into a tie down slot of the cooler with which the bracket 900 is being used. FIG. 9C shows a side view of the bracket 900.

The terms "comprises", "comprising", "includes", "including", "having" and 30 their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A removably attachable accessory bracket for a cooler, the removably attachable accessory bracket comprising:
    a substantially horizontal upper portion configured with a recess-fitting, low profile, and the substantially horizontal upper portion having a front end, a back end, and a lower surface;
    a pin extending downwardly from and perpendicularly to the lower surface of the substantially horizontal upper portion, the pin configured with a cooler tie down slot-insertable width and a cooler tie down slot-insertable length, the pin having a front surface extending in a first plane, and the pin connected to the substantially horizontal upper portion at an intermediate location of the substantially horizontal upper portion between the front end of the substantially horizontal upper portion and the back end of the substantially horizontal portion;
    a substantially vertical portion extending downwardly from and perpendicularly to the front end of the substantially horizontal upper portion, the substantially vertical portion having a front surface and a rear surface, the front surface of the substantially vertical portion extending in a second plane substantially parallel to the first plane, the rear surface of the substantially vertical portion being opposite to the front surface of the substantially vertically vertical portion and facing the pin;
    an offset bracket directly attached to the front surface of the substantially vertical portion, the offset bracket having a front surface, the front surface of the offset bracket extending in a third plane, the front surface of the offset bracket being external to and offset from the front surface of the substantially vertical portion such that the second plane is positioned between the first plane and the third plane; and
    a tie down slot disposed in the offset bracket below a lowermost edge of the substantially vertical portion, the tie down slot having a portion extending in the third plane, the tie down slot being substantially parallel to a longitudinal axis of the substantially vertical portion, and the tie down slot extending through the offset bracket from front to back;
    wherein the front surface of the substantially vertical portion is configured as an accessory attachment interface.

2. A removably attachable accessory bracket according to claim 1, wherein the accessory attachment interface is configured for removable accessory attachment.

3. A removably attachable accessory bracket according to claim 1, wherein the accessory attachment interface is adapted to interface with at least one of a rod holder, a cup holder, an ammunition holder, a boga grip holder, and a fly rod holder.

4. A removably attachable accessory bracket according to claim 1, wherein the substantially horizontal upper portion is configured to rest on a large recess of an upper rim of the cooler.

5. A removably attachable accessory bracket according to claim 1, wherein the substantially horizontal upper portion is configured to rest on a small recess of an upper rim of the cooler.

6. A removably attachable accessory bracket according to claim 1, wherein the pin is between ⅛" and 4" wide, and the pin is between ⅛" and 10" long.

7. A removably attachable accessory bracket according to claim 1, wherein a space between the pin and the rear surface of the substantially vertical portion is between ⅛" and 4".

8. A removably attachable accessory bracket according to claim 1, wherein the pin is configured to be insertable into a cooler tie down slot using at least one of a compression fit, a mechanical fit and gravity.

9. A removably attachable accessory bracket according to claim 1, further comprising a locking mechanism reversibly connecting the pin to the offset bracket opposite the substantially horizontal upper portion.

10. A removably attachable accessory bracket according to claim 1, wherein the recess-filing, low profile is 0.5" or less.

11. A removably attachable accessory bracket according to claim 1, wherein the recess-filing, low profile is 0.25" or less.

12. A removably attachable accessory bracket according to claim 1, wherein the recess-fitting, low profile is 0.125" or less.

\* \* \* \* \*